(12) United States Patent
Bowden et al.

(10) Patent No.: US 9,050,891 B2
(45) Date of Patent: Jun. 9, 2015

(54) ARTICULATING INSTRUMENT CLUSTER

(71) Applicants: Upton Beall Bowden, Canton, MI (US); Jeffrey Mark Schroeder, Rochester Hills, MI (US); Dale O. Cramer, Royal Oak, MI (US); David Christopher Round, Saline, MI (US)

(72) Inventors: Upton Beall Bowden, Canton, MI (US); Jeffrey Mark Schroeder, Rochester Hills, MI (US); Dale O. Cramer, Royal Oak, MI (US); David Christopher Round, Saline, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 33 days.

(21) Appl. No.: 13/951,272

(22) Filed: Jul. 25, 2013

(65) Prior Publication Data

US 2015/0029018 A1  Jan. 29, 2015

(51) Int. Cl.
  *B60Q 1/00* (2006.01)
  *B60K 37/02* (2006.01)
  *G07C 5/08* (2006.01)

(52) U.S. Cl.
  CPC .............. *B60K 37/02* (2013.01); *G07C 5/0825* (2013.01); *B60K 2350/00* (2013.01); *B60K 2350/10* (2013.01)

(58) Field of Classification Search
  USPC .............. 340/425.5, 438, 439, 459, 461, 462; 701/1, 50
  See application file for complete search history.

(56) References Cited

U.S. PATENT DOCUMENTS

| | | | |
|---|---|---|---|
| 6,690,268 B2 * | 2/2004 | Schofield et al. | 340/438 |
| 6,826,465 B2 * | 11/2004 | Ishimoto et al. | 701/50 |
| 6,975,215 B2 * | 12/2005 | Schofield et al. | 340/438 |
| 7,460,007 B2 * | 12/2008 | Schofield et al. | 340/438 |
| 7,583,184 B2 * | 9/2009 | Schofield et al. | 340/438 |
| 2006/0017552 A1 * | 1/2006 | Andreasen et al. | 340/438 |

FOREIGN PATENT DOCUMENTS

EP    1956064 A1    8/2008

* cited by examiner

*Primary Examiner* — Van Trieu
(74) *Attorney, Agent, or Firm* — Dickinson Wright PLLC

(57) ABSTRACT

An articulating instrument cluster, and a system and a method for managing an articulating information panel of a vehicle are provided. The system includes a state detection module to detect a state of the articulating instrument cluster; an information interfacing module to interface with a plurality of systems associated with the vehicle; an orientation module to determine an adjustment to a display based on the detected state; and a display driving module to control the display of the articulating information panel based on the determination of adjustment.

9 Claims, 6 Drawing Sheets

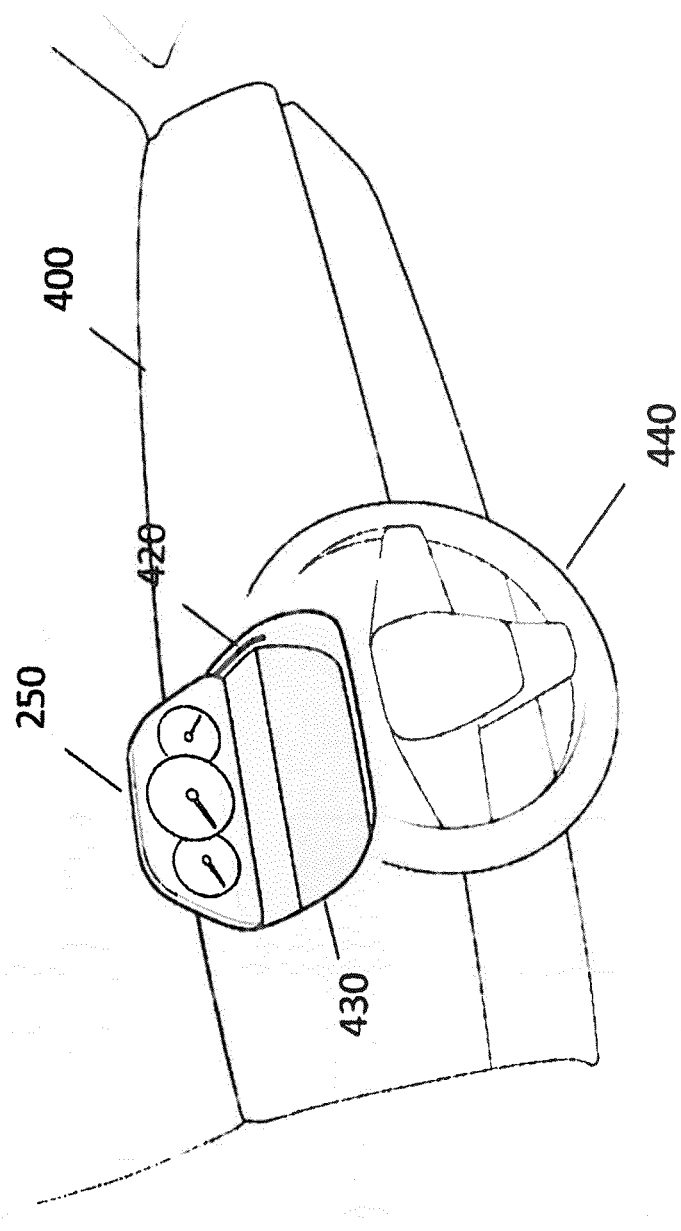

ARTICULATING INSTRUMENT CLUSTER

BACKGROUND

Vehicles, such as automobiles, may be equipped with an instrument cluster. The instrument cluster may provide the operator with useful information for operating and driving the vehicle. The instrument cluster may indicate the speed of the vehicle, the revolutions-per-minute (RPM) of the vehicle's engine, a present state of the lighting, a present state of the windshield wipers, for example. The instrument cluster may employ mechanical gauges, digital displays, or a combination thereof to convey information about the status of the vehicle.

Instrument clusters may be embedded or placed in the dashboard of the vehicle behind the steering wheel. This ensures that the instrument cluster is in a line of sight for the vehicle's driver. Thus, the vehicle's driver may view the road while safely glancing at the instrument cluster to obtain useful information for aiding in the operation of the vehicle. The instrument cluster's placement is static, and thus fixed in a specific location. In a traditional installation, the instrument cluster is mounted low enough on the instrument panel or dashboard to avoid interfering with the drivers view of the road. In contrast, a HUD image is located above the dashboard and above the instrument cluster in a location where the driver views the road through the HUD image on the windshield or on the combiner.

Conventionally, instrument cluster size and location are constrained by "rim block", which refers to the steering wheel blocking the driver's view of the instrument cluster. The vehicle's driver may adjust a seat or the steering wheel. However, in the process of adjusting the seat or the steering wheel to view the instrument cluster, a non-ergonomic or comfortable position may be realized by the vehicle's driver.

Transparent displays allow for the placement of a display in an area that conventionally has not been employed for this purpose. The transparent display may retain a significant transparent nature; however, can be equipped with an emissive display capability. The emissive display allows the transparent display to be implemented independent of a backlighting source. Accordingly, the transparent display may be capable of allowing light to pass through while being able to provide information through selective emissive lighting.

SUMMARY

An articulating instrument cluster, and a system and a method for managing an articulating information panel of a vehicle are provided. The system includes a state detection module to detect a state of the articulating instrument cluster; an information interfacing module to interface with a plurality of systems associated with the vehicle; an orientation module to determine an adjustment to a display based on the detected state; and a display driving module to control the display of the articulating information panel based on the determination of adjustment.

DESCRIPTION OF THE DRAWINGS

The detailed description refers to the following drawings, in which like numerals refer to like items, and in which:

FIGS. 4(a)-(c) illustrate an example implementation of an articulating instrument cluster.

DETAILED DESCRIPTION

Figure 1:
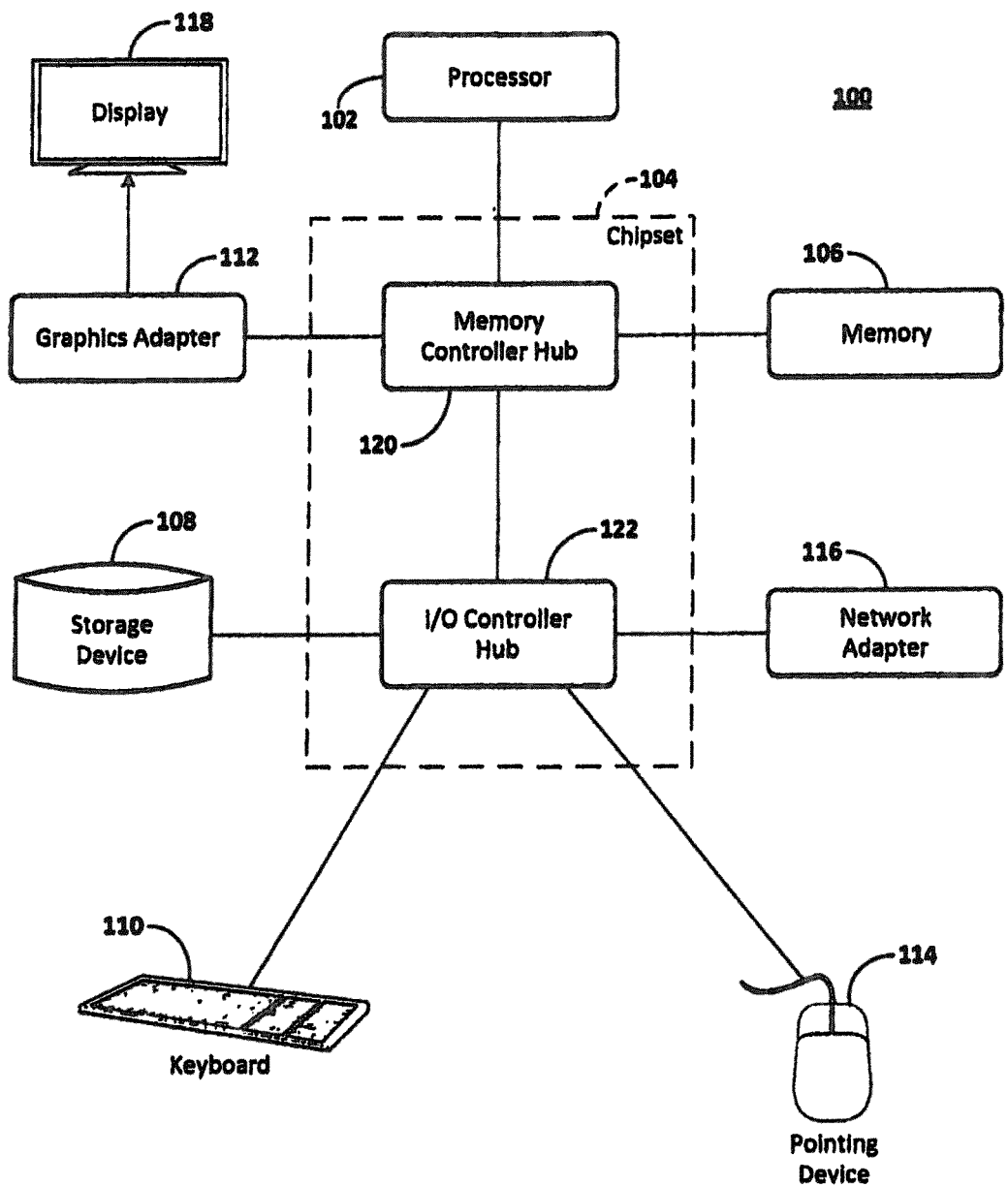
FIG. 1 is a block diagram illustrating an example computer.

Instrument clusters implemented for augmenting the operating experience of a vehicle have conventionally been embedded in an area of a dashboard behind car forward of a steering wheel. Alternatively, the instrument cluster may be embedded in other portions of the dashboard, including an area surrounding the steering wheel.

In certain applications, a heads-up display (HUD) may be employed for the supplement of an instrument cluster. The HUD image may be any transparent display that presents data without requiring a viewer to look away from a viewpoint required to see the forward facing view of the road and surrounding area. In a vehicle, the HUD image may be reflected in a portion of a glass used for the front window of the vehicle.

In certain implementations, the HUD may be setup with a projection unit, a combiner, and a video generation computer. The projection unit in a typical HUD is an optical collimator setup: a convex lens or concave mirror with a cathode ray tube, light emitting diode, OLED, laser, liquid crystal display, or any form of display or image source at its source.

The combiner is typically an angled flat piece of glass (a beam splitter) located directly in front of the viewer that redirects the projected image from projector in such a way as to see the field of view and the projected image at the same time. Combiners may have special coatings that reflect the monochromatic or color light projected onto it from the projector unit while allowing all other wavelengths of light to pass through. In some optical layouts, combiners may also have a curved surface to refocus the image from the projector.

The computer provides the interface between the HUD (i.e. the projection unit) and the systems/data to be displayed, and generates the imagery to be displayed by the projection unit. A description of a computer is further elaborated in FIG. 1.

However, in the implementations described above, the instrument clusters are all static. And while certain aspects of the HUD may be configurable to be movable (based on where the information is projected), the instrument cluster still remains in a fixed orientation.

Disclosed herein are methods and systems for the implementation of an articulating instrument cluster. By equipping the instrument cluster with articulating features, the instrument cluster becomes selectively adjustable into various orientations. For example, the articulated instrument cluster may be oriented in a first state in a dashboard embedded state (in-dashboard). In a second orientation, the articulated instrument cluster may be moved to a second state, the second state resembling a HUD combiner screen.

In this way, because the position of the instrument cluster is configurable, various positions may be realized. This may aid in making the instrument cluster more accessible to those operators of vehicles with a specific desire for the location of the instrument cluster.

Further, by employing an emissive transparent display, a projector unit is not employed in the implementation of the articulating instrument cluster. Thus, if the instrument cluster changes location, a corresponding change of a location of the projector unit is not performed.

The aspects disclosed herein allow for an additional technique to adjust the view of the instrument cluster in a way that allows certain drivers to view the instrument cluster in an ergonomic and comfortable fashion. Without the aspects disclosed herein, the vehicle's driver merely has the ability to adjust a steering wheel or a seat configuration. By employing an adjustable instrument cluster, the vehicle's driver may maintain a comfortable situation, while increasing the viewability of the instrument cluster (i.e. removing rim blocking, for example).

FIG. 1 is a block diagram illustrating an example computer 100. The computer 100 includes at least one processor 102 coupled to a chipset 104. The chipset 104 includes a memory controller hub 120 and an input/output (I/O) controller hub 122. A memory 106 and a graphics adapter 112 are coupled to the memory controller hub 120, and a display 118 is coupled to the graphics adapter 112. A storage device 108, keyboard 110, pointing device 114, and network adapter 116 are coupled to the I/O controller hub 122. Other embodiments of the computer 100 may have different architectures.

The storage device 108 is a non-transitory computer-readable storage medium such as a hard drive, compact disk read-only memory (CD-ROM), DVD, or a solid-state memory device. The memory 106 holds instructions and data used by the processor 102. The pointing device 114 is a mouse, track ball, or other type of pointing device, and is used in combination with the keyboard 110 to input data into the computer system 100. The graphics adapter 112 displays images and other information on the display 118. The network adapter 116 couples the computer system 100 to one or more computer networks.

The computer 100 is adapted to execute computer program modules for providing functionality described herein. As used herein, the term "module" refers to computer program logic used to provide the specified functionality. Thus, a module can be implemented in hardware, firmware, and/or software. In one embodiment, program modules are stored on the storage device 108, loaded into the memory 106, and executed by the processor 102.

The types of computers used by the entities and processes disclosed herein can vary depending upon the embodiment and the processing power required by the entity. The computer 100 may be a mobile device, tablet, smartphone or any sort of computing element with the above-listed elements. For example, a video corpus, such as a hard disk, solid state memory or storage device, might be stored in a distributed database system comprising multiple blade servers working together to provide the functionality described herein. The computers can lack some of the components described above, such as keyboards 110, graphics adapters 112, and displays 118.

Figure 2:
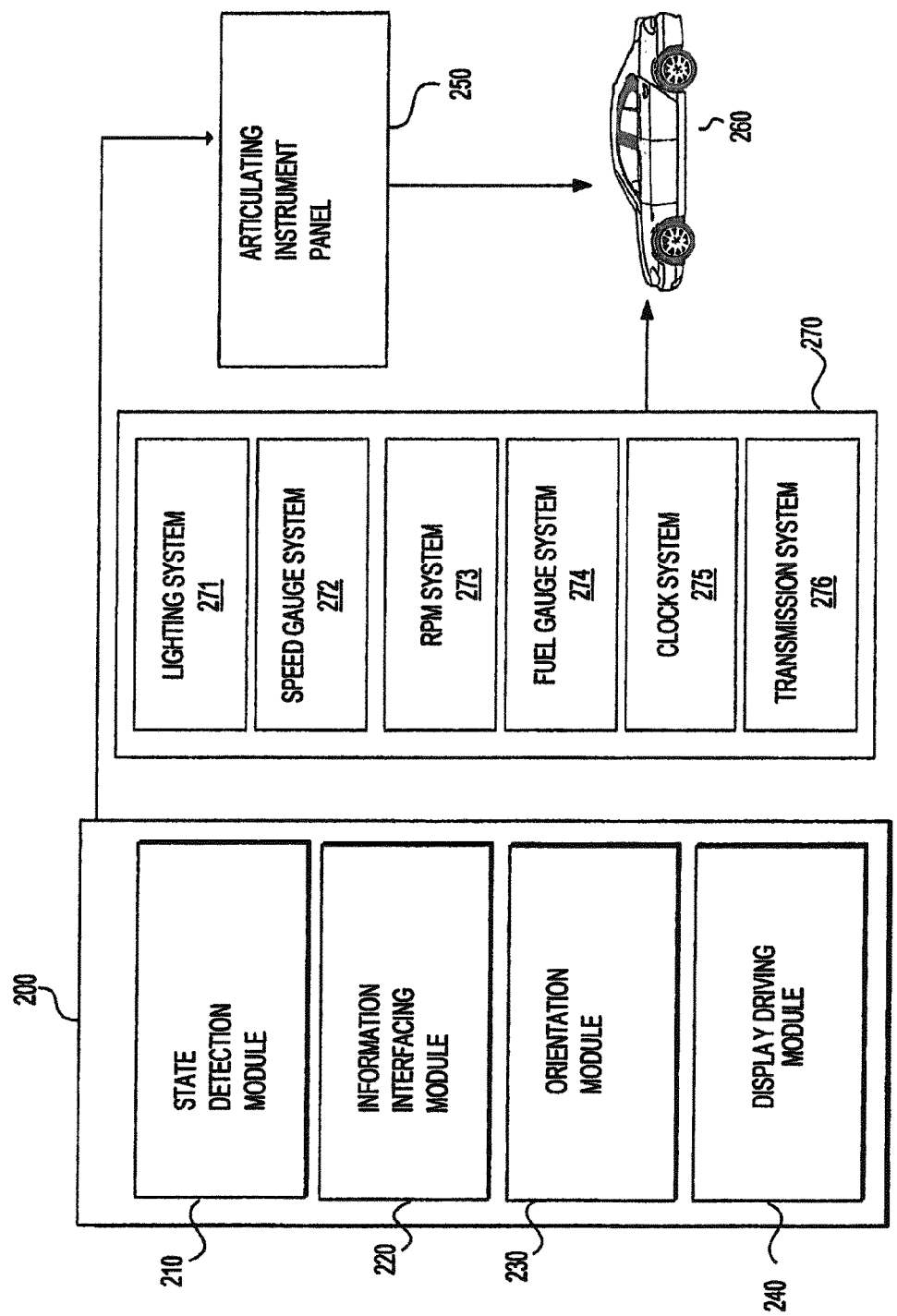
FIG. 2 illustrates an example of a system for managing an articulating instrument cluster.

FIG. 2 illustrates an example of a system 200 for managing an articulating instrument cluster 250. The system 200 and the instrument cluster 201 may be implemented in a vehicle 260. The system 200 includes a state detection module 210, an information interfacing module 220, an orientation module 230, and a display driving module 240.

The vehicle 260 may include a plurality of vehicle systems 270. The plurality of vehicle systems 270 may include a lighting system 271, a speed gauge system 272, a revolution-per-minute (RPM) system 273, a fuel gauge system 274, a clock system 275, a transmission system 276, for example. Essentially, any sort of system that indicates a status associated with vehicle 260 may be included as one of the plurality of vehicle systems 270. Each of the above-identified systems 270 of the vehicle 260 may interface with a device, incorporating certain of the aspects described with computer 100, to store a current state associate with the system or operation associated with each respective system. Additionally, the communication with each of the modules may be bi-directional, and be controlled by an indication of the vehicle 260's operator.

Several of the examples disclosed below are described with a transparent display. However, the aspects disclosed herein may be implemented with non-transparent displays as well.

The articulating instrument cluster 250 may be an emissive transparent display. Thus, by being emissive, the articulating instrument cluster 250 does not require a projection unit to display information via light. The system could also be a transmissive technology where the display module does not generate light itself. Instead a transflective display could also be used. Transflective displays use external sources of lighting to display images (i.e. sunlight, front lighting, etc).

Along with the transmissive display, which allows the display to be viewed at night (due to the light generated from the display), several additional aspects may be added. In one instance, because light is emitted, light may leak out through the backside of the display. Thus, an anti-reflective coating may be added to the back of the display to prevent or limit this leaking. In other implementations, various light blocking techniques may be used, such as optical films, polarizing films, louver films, and the like.

The state detection module 210 determines a state of the articulating instrument cluster 250. The state detection module 210 may be configured to detect the state through various techniques. For example, if the articulating instrument cluster 250 is residing in a specific state, the state detection module 210 may receive a signal indicating the specific state.

Alternatively, the state detection module 210 may be configured to detect a state change based on a mechanical or digital indication to change the position of the articulating instrument cluster 250. For example, as shown below, the articulating instrument cluster 250 may be physically moved by an operator of vehicle 260 from a first position (i.e. a first state) to a second position (i.e. a second state). The state detection module 210 may receive an indication that the articulating instrument cluster 250 is in transition from a first state to a second state.

The information interfacing module 220 interfaces with the above-listed systems 270 of vehicle 260. The information sourced from the information interfacing module 220 may be provided via digital signals or gauges directed to the plurality of systems 270. The frequency of how often the systems are monitored may be determined by an implementation of system 200.

The orientation module 230 determines an adjustment of display based on the state detected by the state detection module 210. Thus, depending on the position of the articulating instrument cluster 250, the orientation module 230 determines whether the display is modified. As explained further in this disclosure, the articulating instrument cluster 250 may be either in a HUD state, or an in-dashboard state. The display is either rotated or inversed depending on the state.

In the above-example, two states are disclosed. However, one of ordinary skill in the art may implement system 200 with multiple states, such as positions in-between the HUD state and the in-dashboard state. Thus, an orientation desired by the driver may be realized.

Further, the adjustment shown in the figures refers to a flippable system. However, in other situations, the system may be implemented with other mechanical adjustment techniques, such as a vertical slide functionality and the like.

The display driving module 240 serves to drive the articulating instrument cluster 250 with appropriate signals based on the orientation module 230's determined adjustment. The display driving module 240 may be any sort of control circuitry employed to selectively alter the display of the articulating instrument pane 250.

Alternatively, the display driving module 240 may be implemented in a way so that a physical image is displayed on the articulating instrument cluster 250. An advantage of this, as opposed to a HUD display which requires complex optics, image distortion/correction, and/or a unique windshield, is that a driver may look through the articulating instrument cluster 250. Thus, a simpler implementation and better driving experience is realized.

Figure 3:
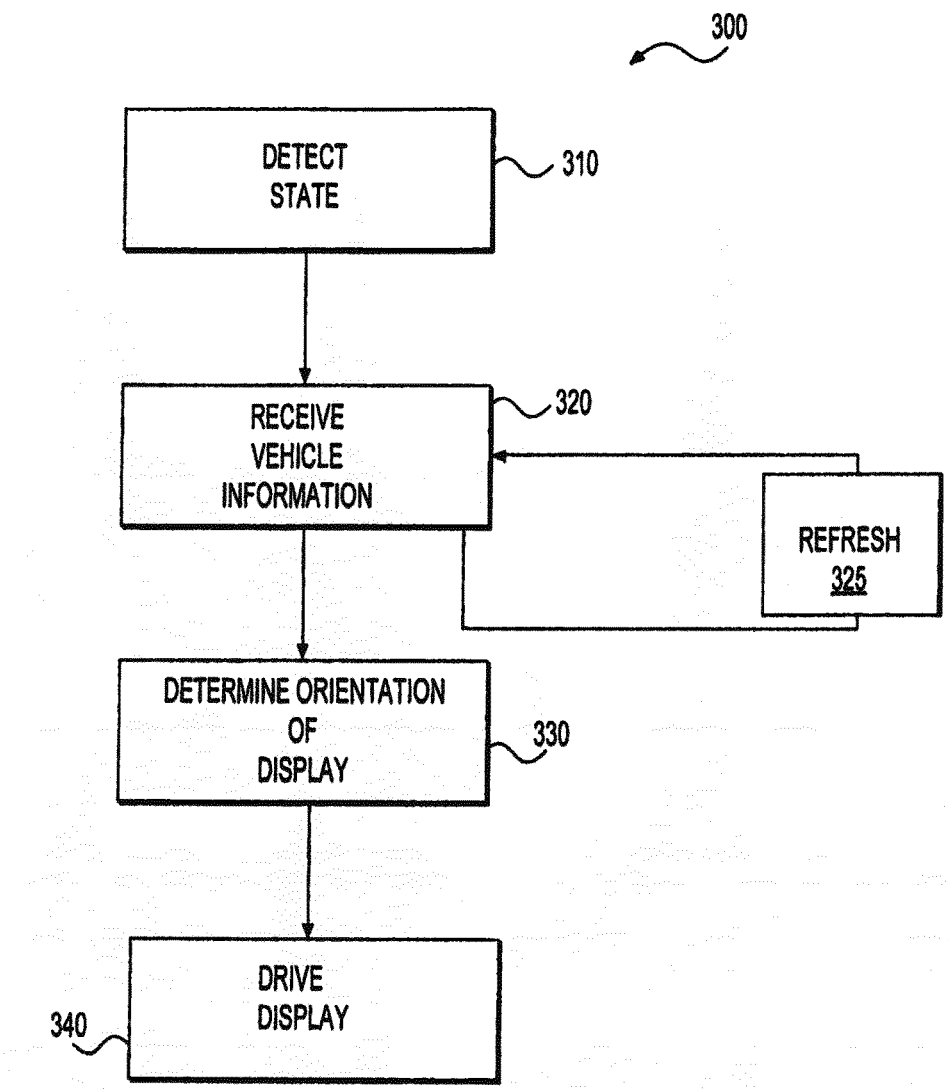
FIG. 3 illustrates an example of a method for managing an articulating instrument cluster.

FIG. 3 illustrates an example method 300 for managing an articulating instrument cluster 250. The method 300 may be implemented on a system or device, such as system 200. The articulating instrument cluster 250 is implemented along with vehicle 260 in the manner described above.

In operation 310, a state of the articulating instrument cluster 250 is determined. As explained above in regards to FIG. 2, the determination may be accomplished by a sensor detecting the current position of the articulating instrument cluster 250, or a detection of a transition from one state to another.

In operation 320, various information from the plurality of systems 270 associated with vehicle 260 are received. Operation 320 may occur in parallel with the other steps of method 300. Thus, the information about the status of the vehicle 260 may be updated in real-time, as indicated by operation 325 (refreshing the detection of the various sensors 270).

In operation 330, an orientation of the display is determined. The determined orientation may be made in conjunction with the detected state of operation 310. For example, the display may be optimally presented based on the position/state of the articulating instrument cluster 250.

In operation 340, based on adjustments made due to the determined orientation, a display driving control circuitry electronically manipulates a display of an articulating instrument cluster 250 to display the information received in operation 320. Thus, an operator of vehicle 260 may be cognizant of the current status of the vehicle 260 by viewing the display of articulating instrument cluster 250.

Figure 4B:
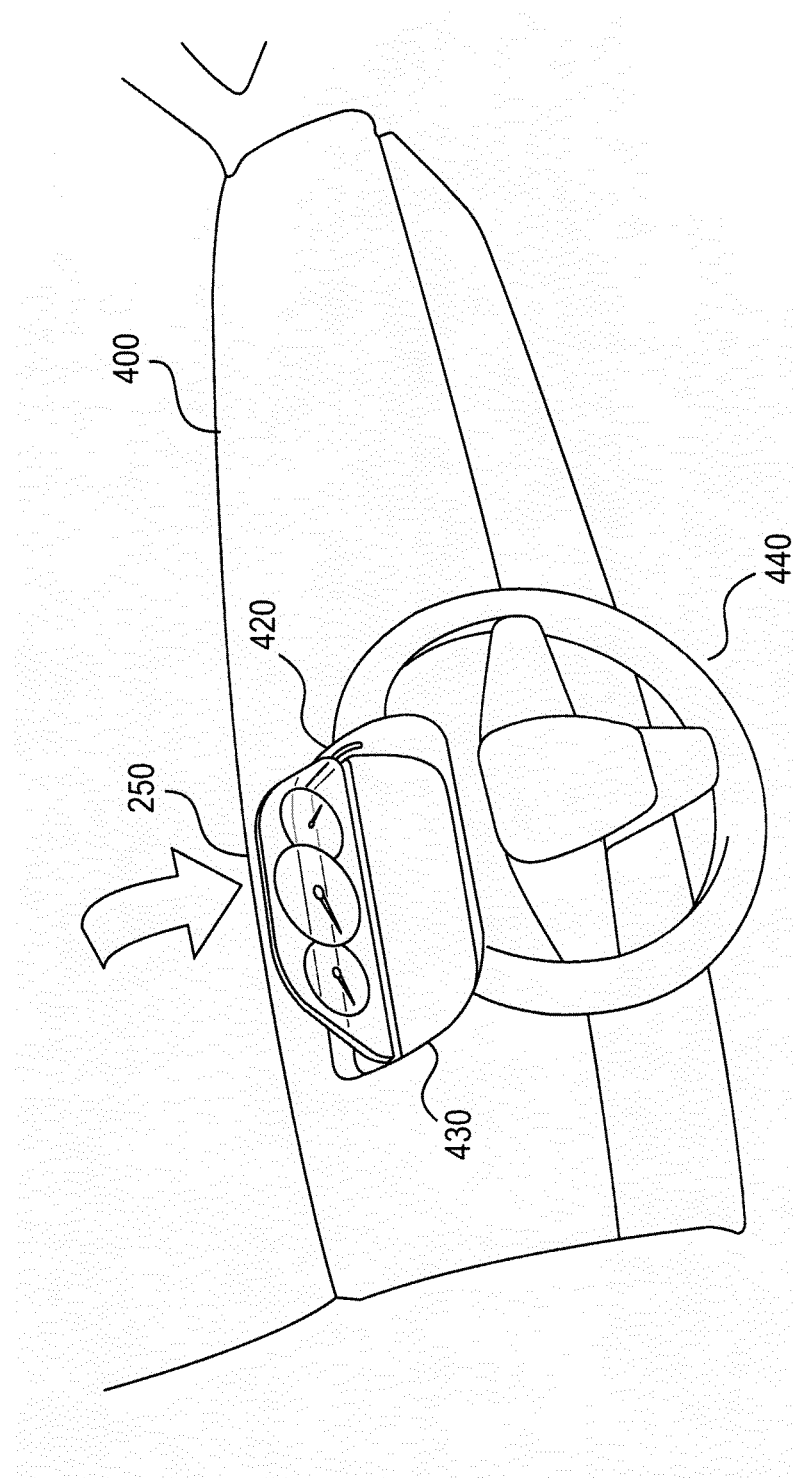
Figure 4C:
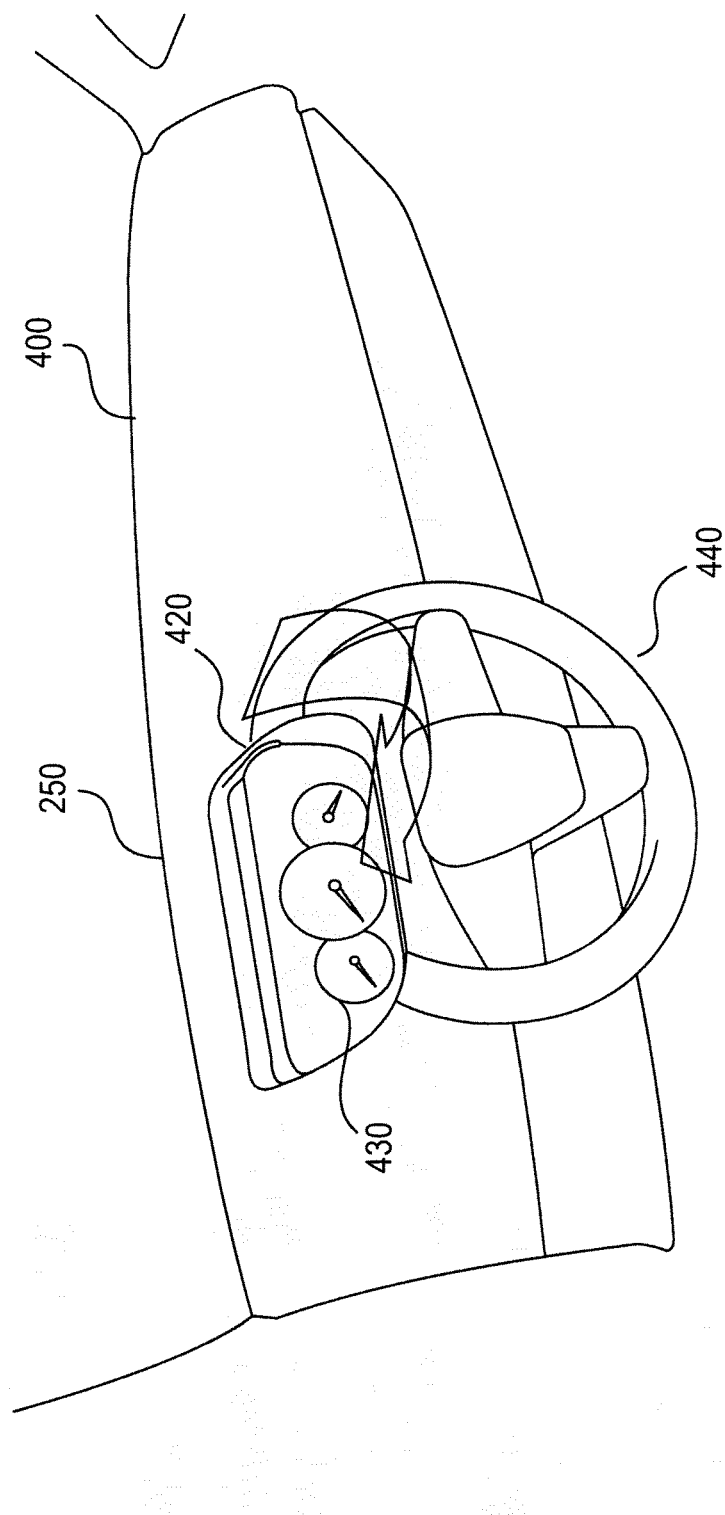

FIGS. 4(a)-(c) illustrate an example of an articulating instrument cluster 250 at various states. The articulating instrument cluster 250 is embedded in a compartment 430 of a dashboard 400 of vehicle 260. The articulating instrument cluster 250 is a transparent display, thereby allowing an operator of the vehicle 260 to significantly see-through the articulating instrument cluster 250.

For illustrative purposes, the components of FIGS. 4(a)-(c) are shown as if the steering wheel 440 would not block the view of the components. This is done merely for illustrative purposes to aid in the explanation with the aspects disclosed herein.

Referring to FIG. 4(a), a first state of the articulating instrument cluster 250 is shown. The first state represents a HUD orientation of the articulating instrument cluster 250. The system 200 (not shown) may detect that the articulating instrument cluster 250 is in the HUD orientation, and adjust a display accordingly.

As shown, the articulating instrument cluster 250 displays various indicia representing the current status of various systems 270 of the vehicle 260. The indicia may be digital numbers, symbols or the like that present the operator of the vehicle 260 with an update of the vehicle 260's current operation or status.

Also shown in FIG. 4(a) are a compartment 430 and a tracking rail 420. The compartment 430 serves to house the articulating instrument cluster 250 in another state (described further below). The tracking rail 420 provides a track to slide or place the articulating instrument cluster 250 into another state. The tracking rail 420 is one such technique for adjusting the articulating instrument cluster 250, and thus, other mechanical techniques may be employed to alter the state of the articulating instrument cluster 250.

Referring to FIG. 4(b), a transition from a first state to a second state of the articulating instrument cluster 250 is shown. A user or mechanical force (such as a motorized operation) causes the articulating instrument cluster 250 to move in a direction shown in FIG. 4(b). The articulating instrument cluster 250's movement is significantly guided by the tracking rail 420. The tracking rail 420 may be engaged by a fastening piece (not shown) attached to the articulating instrument cluster 250.

Referring to FIG. 4(c), a second state of the articulating instrument cluster 250 is shown. The second state depicts the articulating instrument cluster 250 in an in-dashboard orientation. The in-dashboard orientation may correspond to the articulating instrument cluster 250 being significantly nested in the compartment 430.

As shown by the transition from the HUD display state to the in-dashboard state, the articulating transparent display 250 may be flipped over. Thus, the surface being seen by a user is the opposite surface of that being displayed during the first state. Due to the emissive and transparent nature of the display, the opposite side may be used for display purposes as well.

The system 200 (not shown) may detect the second state, and accordingly, cause the display to be adjusted on the articulating instrument cluster 250. The articulating instrument cluster 250 shows the same indicia in FIGS. 4(a) and 4(c). However, the articulating instrument cluster 250 is physically inverted, and displaying an opposing side to the operator of vehicle 260. Based on the aspects disclosed in conjunction with system 200, the display on the articulating instrument cluster 250 may be adjusted accordingly.

Thus, an operator of a vehicle 260 may be presented with an articulating instrument cluster 250, and systems and methods to adjust the display based on the articulating instrument cluster 250 being situated in various orientations. By providing the operator with this flexibility, the articulating instrument cluster 250 serves to be more robust and efficient than a conventional instrument cluster by providing driver information in a location and manner that is most convenient to the driver Certain of the devices shown in FIG. 1 include a computing system. The computing system includes a processor (CPU) and a system bus that couples various system components including a system memory such as read only memory (ROM) and random access memory (RAM), to the processor. Other system memory may be available for use as well. The computing system may include more than one processor or a group or cluster of computing system networked together to provide greater processing capability. The system bus may be any of several types of bus structures including a memory bus or memory controller, a peripheral bus, and a local bus using any of a variety of bus architectures. A basic input/output (BIOS) stored in the ROM or the like, may provide basic routines that help to transfer information between elements within the computing system, such as during start-up. The computing system further includes data stores, which maintain a database according to known database management systems. The data stores may be embodied in many forms, such as a hard disk drive, a magnetic disk drive, an optical disk drive, tape drive, or another type of computer readable media which can store data that are accessible by the processor, such as magnetic cassettes, flash memory cards, digital versatile disks, cartridges, random access memories (RAMs) and, read only memory (ROM). The data stores may be connected to the system bus by a drive interface. The data stores provide nonvolatile storage of computer readable instructions, data structures, program modules and other data for the computing system.

To enable human (and in some instances, machine) user interaction, the computing system may include an input device, such as a microphone for speech and audio, a touch sensitive screen for gesture or graphical input, keyboard, mouse, motion input, and so forth. An output device can include one or more of a number of output mechanisms. In some instances, multimodal systems enable a user to provide multiple types of input to communicate with the computing system. A communications interface generally enables the computing device system to communicate with one or more other computing devices using various communication and network protocols.

The preceding disclosure refers to a number of flow charts and accompanying descriptions to illustrate the embodiments represented in FIG. 3. The disclosed devices, components, and systems contemplate using or implementing any suitable technique for performing the steps illustrated in these figures. Thus, FIG. 3 is for illustration purposes only and the described or similar steps may be performed at any appropriate time, including concurrently, individually, or in combination. In addition, many of the steps in these flow charts may take place simultaneously and/or in different orders than as shown and described. Moreover, the disclosed systems may use processes and methods with additional, fewer, and/or different steps.

Embodiments disclosed herein can be implemented in digital electronic circuitry, or in computer software, firmware, or hardware, including the herein disclosed structures and their equivalents. Some embodiments can be implemented as one or more computer programs, i.e., one or more modules of computer program instructions, encoded on a tangible computer storage medium for execution by one or more processors. A computer storage medium can be, or can be included in, a computer-readable storage device, a computer-readable storage substrate, or a random or serial access memory. The computer storage medium can also be, or can be included in, one or more separate tangible components or media such as multiple CDs, disks, or other storage devices. The computer storage medium does not include a transitory signal.

As used herein, the term processor encompasses all kinds of apparatus, devices, and machines for processing data, including by way of example a programmable processor, a computer, a system on a chip, or multiple ones, or combinations, of the foregoing. The processor can include special purpose logic circuitry, e.g., an FPGA (field programmable gate array) or an ASIC (application-specific integrated circuit). The processor also can include, in addition to hardware, code that creates an execution environment for the computer program in question, e.g., code that constitutes processor firmware, a protocol stack, a database management system, an operating system, a cross-platform runtime environment, a virtual machine, or a combination of one or more of them.

A computer program (also known as a program, module, engine, software, software application, script, or code) can be written in any form of programming language, including compiled or interpreted languages, declarative or procedural languages, and the program can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

To provide for interaction with an individual, the herein disclosed embodiments can be implemented using an interactive display, such as a graphical user interface (GUI). Such GUI's may include interactive features such as pop-up or pull-down menus or lists, selection tabs, scannable features, and other features that can receive human inputs.

The computing system disclosed herein can include clients and servers. A client and server are generally remote from each other and typically interact through a communications network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

We claim:

1. A system for managing an articulating information panel of a vehicle, comprising:
   a data store comprising a non-transitory computer readable medium storing a program of instructions for the managing of the articulating information panel;
   a processor that executes the program of instructions;
   a state detection module to detect a state of the articulating instrument cluster, a first state being an instrument panel embedded in a dashboard of the vehicle, and a second state being a heads-up display;
   an information interfacing module to interface with a plurality of systems associated with the vehicle;
   an orientation module to determine an adjustment to a display based on the detected state, and
   a display driving module to control the display of the articulating information panel based on the determination of
   wherein the display includes a front surface and a back surface parallel to each other, the front surface and the back surface each being configured to display information from the information interfacing module, the front surface displaying information in response to the articulating instrument panel being in the first state, the back surface displaying information in response to the articulating instrument panel being in the second state, and
   the display being an emissive transparent display that allows a viewer to see-through the display.

2. The system according to claim 1, wherein the plurality of systems consists of one, some or all of the following: a lighting system, a speed gauge system, a revolution-per-minute (RPM) system, a fuel gauge system, a clock system, and a transmission system.

3. The system according to claim 1, wherein the state detection module detects a new state based on a sensor indicating the state.

4. The system according to claim 1, wherein the state detection module detects a new state based on a transition from a previous state to the current state.

5. An articulating instrument cluster of a vehicle, comprising:

a display surface to display information associated with an operation of the vehicle, the display location being adjustable; and a control circuit to adjust the display, the display being adjustable to a first state and a second state, the first state being an instrument panel embedded in a dashboard, and the second state being heads-up display, wherein the display includes a front surface and a back surface parallel to each other, the front surface and the back surface each being configured to display information from the information interfacing module, the front surface displaying information in response to the articulating instrument panel being in the first state, the back surface displaying information in response to the articulating instrument panel being in the second state, and the display being an emissive transparent display that allows a viewer to see-through the display.

6. The panel of claim 5, further comprising:

a tracking and pivot rail to facilitate the adjustment of the display surface.

7. The panel of claim 6, wherein the display surface is in an in-dashboard state in response to being embedded in the compartment, and a heads-up display (HUD) state in response to being in a position outside the compartment.

8. The panel of claim 7, wherein the control circuit inverts the display from a transition from the in-dashboard state to the HUD state.

9. The panel of claim 5, wherein the information associated with an operation of the vehicle consists of one, some or all of the following: a lighting system, a speed gauge system, a revolution-per-minute (RPM) system, a fuel gauge system, a clock system, and a transmission system.

* * * * *